US008270010B2

(12) United States Patent
Nogawa et al.

(10) Patent No.: US 8,270,010 B2
(45) Date of Patent: *Sep. 18, 2012

(54) IMAGE FORMING APPARATUS AND COMPUTER-READABLE MEDIUM

(75) Inventors: Hiroshi Nogawa, Hachioji (JP); Fumihito Akiyama, Yokohama (JP); Masahiro Ozawa, Hino (JP); Jun Kuroki, Sagamihara (JP); Yasufumi Aoyama, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1154 days.

This patent is subject to a terminal disclaimer.

(21) Appl. No.: 12/115,060

(22) Filed: May 5, 2008

(65) Prior Publication Data

US 2009/0089533 A1 Apr. 2, 2009

(30) Foreign Application Priority Data

Sep. 28, 2007 (JP) ................................ 2007-255457

(51) Int. Cl.
*G06F 3/12* (2006.01)
*G06K 15/00* (2006.01)
(52) U.S. Cl. ..................................... 358/1.15; 358/1.16
(58) Field of Classification Search .................. None
See application file for complete search history.

(56) References Cited

U.S. PATENT DOCUMENTS

| 6,031,624 A * | 2/2000 | Murphy ....................... 358/1.17 |
| 6,961,139 B1 | 11/2005 | Kita et al. |
| 8,046,497 B2 * | 10/2011 | Nogawa et al. ............... 709/247 |
| 2002/0114004 A1 | 8/2002 | Ferlitsch |
| 2007/0216925 A1 | 9/2007 | Nakamura |

FOREIGN PATENT DOCUMENTS

| JP | 06-106813 | 4/1994 |
| JP | 06-230907 | 8/1994 |

(Continued)

OTHER PUBLICATIONS

Notification of Reasons for Refusal issued in corresponding Japanese Application No. 2007-255428 dated Sep. 15, 2009, and an English Translation thereof.

(Continued)

*Primary Examiner* — Dov Popovici
(74) *Attorney, Agent, or Firm* — Buchanan Ingersoll & Rooney PC

(57) ABSTRACT

Disclosed is an image forming apparatus including a communication section connected to a data processing apparatus through a communication line to perform image formation on the basis of data transmitted from the data processing apparatus through the communication section, the apparatus including: a plurality of storage sections each of which has a different free storage capacity and a different access speed; and a control section to obtain data size information of an XPS file from the XPS file including the data size information thereof in a head of a file data frame, the XPS file being received from the data processing apparatus through the communication section, to select a storage section to store the XPS file from the plurality of storage sections on the basis of the data size information, and to allow the selected storage section to store the XPS file.

8 Claims, 12 Drawing Sheets

FOREIGN PATENT DOCUMENTS

| | | |
|---|---|---|
| JP | 07-177356 | 7/1995 |
| JP | 07-281939 | 10/1995 |
| JP | 11-179977 A | 7/1999 |
| JP | 11-215181 | 8/1999 |
| JP | 2001-150744 | 6/2001 |
| JP | 2003-271349 | 9/2003 |
| JP | 2006-076058 | 3/2006 |
| JP | 2007-067579 | 3/2007 |
| JP | 2007-235748 | 9/2007 |
| JP | 2007-249859 | 9/2007 |

OTHER PUBLICATIONS

Decision of Refusal issued in the corresponding Japanese Patent Application No. 2007-255457 dated Mar. 23, 2010, and an English Translation thereof.

Notification of Reason for Refusal in JP 2007-255457 dated Aug. 18, 2009, and an English Translation thereof.

Nogawa, Hiroshi, et al., U.S. Appl. No. 12/115,037, entitled "Image Forming Apparatus and Computer Readable Medium," filed May 5, 2008.

\* cited by examiner

FIG.3

```
<psf:Feature name="psk:XPSFileSize">
   <psf:Value xsi:type="xsd:unsignedLong">640000</psf:Value>
</psf:ParameterInit>
```

IMAGE FORMING APPARATUS AND COMPUTER-READABLE MEDIUM

CROSS-REFERENCE TO RELATED APPLICATIONS

The present U.S. Patent Application claims priority under the Paris Convention of Japanese Patent Application No. 2007-255457 filed on Sep. 28, 2007 to the Japanese Patent Office, which shall be a basis for correcting mistranslations.

BACKGROUND

1. Field of the Invention

The present invention relates to an image forming apparatus and a computer-readable medium.

2. Description of Related Art

In recent years, an image forming system in which a data processing apparatus, such as a personal computer (PC), including an installed printer driver therein controls an image forming apparatus through a communication network, such as a local area network (LAN), has become widely used.

Moreover, Microsoft Corporation announced an electronic document standard called as an extensible mark language (XML) paper specification (XPS) standard at the end of 2006. A file of an electronic document in conformity to the XPS standard (hereinafter referred to as an XPS file) includes font data, image data, text data, and the like, and is generated by performing the zone improvement plan (ZIP) compression of these data files (an XML file, an image file, and the like). That is, an XPS file is a ZIP compression file.

The data processing apparatus performs the ZIP compression of an XML file and an image file to generate an XPS file, and transmits the generated XPS file to the image forming apparatus. The image forming apparatus receives the XPS file, and then temporarily spools the file into a storage medium (such as a memory and a hard disk). The image forming apparatus then reads the XPS file from the storage medium and executes the ZIP decompression of the XPS file. Then, the image forming apparatus spools the file data subjected to the ZIP decompression into the storage medium again. The image forming apparatus then reads the file data subjected to the ZIP decompression from the storage medium to perform image forming processing.

Moreover, a technique to change the compression rate of print data by judging from a memory capacity of a memory at the time of storing the print data into the memory for reprinting was disclosed (Japanese Patent Application Laid-open Publication No. Hei 11-179977).

Now, because the image forming apparatus cannot know the data size of the XPS file at the start of receiving the XPS file, the image forming apparatus will spool the XPS file into a predetermined storage medium.

The XPS file has been consequently stored in a storage medium (for example, a memory) that has a fast access speed but an insufficient storage capacity, and a situation in which the storage capacity runs short on the way to receiving the XPS file has occurred. In this case, the image forming apparatus receives the XPS file from the beginning again to store the file data in another storage medium (for example, a hard disk) having a larger storage capacity. Consequently, a delay of the image forming processing results.

Moreover, although there is a storage medium (for example, a memory) having a sufficient storage capacity to store the XPS file and having a fast access speed, the image forming apparatus stores the XPS file into a storage medium (for example, a hard disk) having a slow access speed, and consequently a delay of the image forming processing results.

Moreover, if the data size of the XPS file is too large and it is impossible to store the file in any storage media equipped in the image forming apparatus, the image forming apparatus continues to receive the XPS file until the storage capacity overflows. At the time point when the storage capacity overflows, the error is detected, and the effect of the overflow is displayed. Consequently, a loss of user's time results.

SUMMARY

The present invention has been made in consideration of the above problems, and it is one of main objects to realize the efficient and high-speed image forming processing to store an XPS file into the optimum storage medium equipped in an image forming apparatus.

To achieve at least one of the above-mentioned objects, an image forming system reflecting one aspect of the present invention comprises:

a data processing apparatus and an image forming apparatus connected through a communication line, wherein the image forming apparatus performs image formation on the basis of data transmitted from the data, processing apparatus through the communication section;

the data processing apparatus includes, a first communication section to communicate with the image forming apparatus through the communication line, and a first control section to generate an XPS file including data size information thereof in a, head of a file data frame, and to control the first communication section to transmit the XPS file to the image forming apparatus; and the image forming apparatus includes, a second communication section to communicate with the data processing apparatus through the communication line, a plurality of storage sections each of which has a different free storage capacity and a different access speed, and a second control section to obtain data size information of an XPS file from the XPS file received from the data processing apparatus through the second communication section, to select a storage section to store the XPS file from the plurality of storage sections on the basis of the data size information, and to allow the selected storage section to store the XPS file.

It is preferable that in the above-described image forming system, the second control section selects the storage section having a faster access speed and a free storage capacity sufficient for storing the XPS file.

An image forming system reflecting another aspect of the present invention comprises:

a data processing apparatus and an image forming apparatus connected through a communication line, wherein the image forming apparatus performs image formation on the basis of data transmitted from the data processing apparatus through the communication section;

the data processing apparatus includes, a first communication section to communicate with the image forming apparatus through the communication line, and a first control section to generate an XPS file storing one or a plurality of stored files each of which including data size information thereof in a head of a file data frame, and to control the first communication section to transmit the XPS file to the image forming apparatus; and the image forming apparatus includes,
a second communication section to communicate with the data processing apparatus through the communication line,
a plurality of storage sections each of which has a different free storage capacity and a different access speed, and
a second control section to perform a processing to each stored file, the processing comprising the steps of: obtaining a data size of the stored file from the stored file stored in an XPS file received from the data processing apparatus through the second communication section; selecting a storage section to store the stored file from the plurality of storage sections on the basis of the data size information; and allowing the selected storage section to store the stored file.

It is preferable that in the above-described image forming system, the second control section selects the storage section having a faster access speed and a free storage capacity sufficient for storing the stored file.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein;

FIG. 3 is data content of a print ticket file;

DETAILED DESCRIPTION OF PREFERRED EMBODIMENTS

First Embodiment

In the following, a first embodiment of an image forming system according to the present invention will be described.

[System Configuration of Image Forming System]

Figure 1:
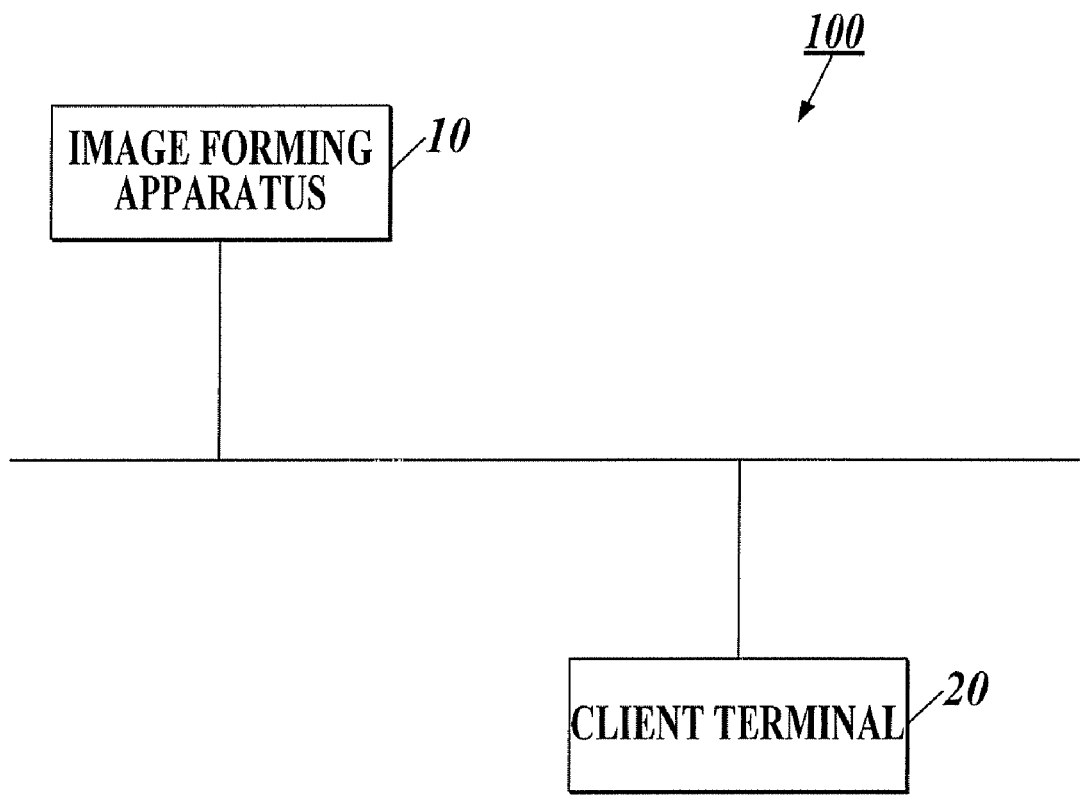
FIG. 1 is a system configuration diagram of an image forming system.

FIG. 1 shows the system configuration of an image forming system 100. As shown in FIG. 1, the image forming system 100 is composed of an image forming apparatus 10 and a client terminal 20, and each apparatus is connected to each other through a communication network N in a state capable of performing data communications.

The image forming apparatus 10 is the so-called multi-function peripheral (MFP) equipped with a copy function, an image reading function, and a printer function, and forms an image on a sheet of paper on the basis of a print job (print instruction) transmitted from the client terminal 20 and image data read by an image reading section, such as a scanner, provided in the image forming apparatus 10.

The client terminal 20 is the so-called personal computer, and has the function of transmitting a print job to the image forming apparatus 10. A printer driver program (hereinafter, sometimes simply referred to as a printer driver) is installed in the client terminal 20, and the client terminal 20 uses the function of the printer driver to generate a print job including the data of print conditions to be applied at the time of image formation, image data, and the like, and to transmit the generated print job to the image forming apparatus 10.

[Functional Configuration of Client Terminal]

Figure 2:
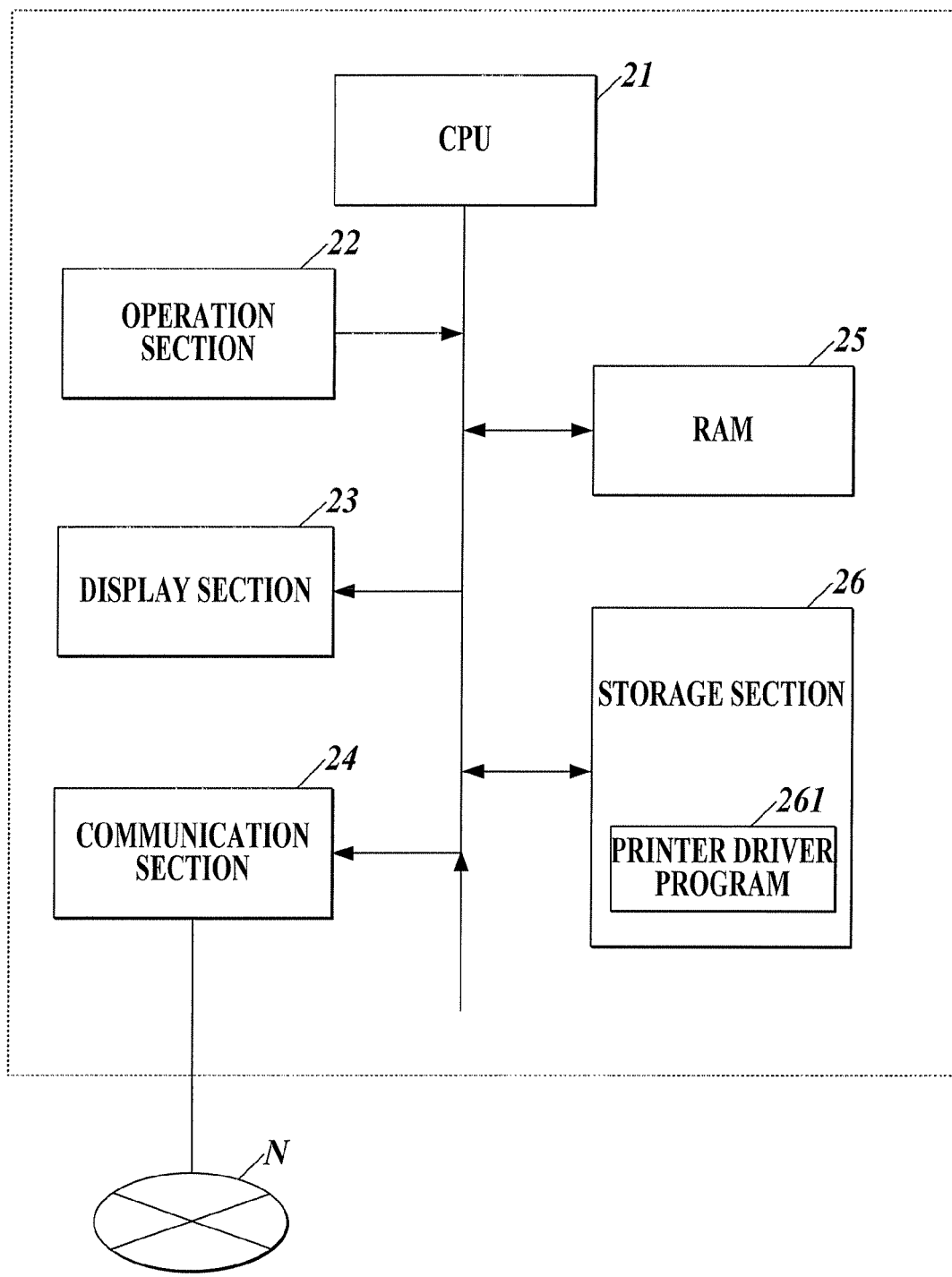
FIG. 2 is a block diagram of a client terminal.

FIG. 2 shows the configuration of the client terminal 20. As shown in FIG. 2, the client terminal 20 is composed of a CPU 21, an operation section 22, a display section 23, a communication section 24, a random access memory (RAM) 25, and a storage section 26.

The CPU 21 reads various processing programs stored in the storage section 26 and expands the read processing programs in a work area formed in the RAM 25 to perform various kinds of processing in cooperation with the programs according to operation signals input from the operation section 22 or instruction signals received by the communication section 24.

The operation section 22 is composed of a keyboard including cursor keys, numeral inputting keys, various function keys, and the like, and a pointing device, such as a mouse, and outputs an instruction signal input by a key operation on the keyboard or a mouse operation to the CPU 21.

The display section 23 is composed of a liquid crystal display (LCD) and displays an input instruction from the operation section 22, data, and the like, in conformity to the instruction of a display signal input from the CPU 21.

The communication section 24 is equipped with a LAN adapter, a router, a terminal adapter (TA), and the like, and performs the transmission and the reception of data with external equipment such as the image forming apparatus 10 connected through the communication network N.

The RAM 25 forms a work area to temporarily store the various processing programs to be executed by the CPU 21 and the data pertaining to these programs.

The storage section 26 is a storage apparatus, such as a hard disk, and stores various programs, set data, image data, and the like. Moreover, the storage section 26 stores a printer driver program 261.

The CPU 21 reads the printer driver program 261 from the storage section 26 to expand the read printer driver program 261 into the RAM 25, and generates print job data to be transmitted to the image forming apparatus 10 in cooperation with the program 261.

To put it concretely, the CPU 21 specifies the image data (image file) or the like that is a print object through the operation section 22 by a user's operation, and sets the information concerning the number of sets, print range, and the like. The CPU 21 then produces a print ticket (print ticket file), which is an XML file to describe an image formation setting. The CPU 21 then adds the generated print ticket file to an image file or the like, and performs the ZIP compression thereof to generate an XPS file. Here, the CPU 21 adds the print ticket file to the image file or the like so that the print ticket file may be stored at the head of the file data frame of the XPS file.

Moreover, the CPU 21 generates print condition data on the basis of the set information concerning the number of sets, the print range, and the like.

The CPU 21 generates the print job data on the basis of the XPS file and the print condition data to once store the generated print job data into the storage section 26.

The CPU 21 next reads the print job data from the storage section 26, and controls the communication section 24 to transmit the print job data to the image forming apparatus 10.

[Print Ticket]

The CPU 21 adds the data size information of the XPS file to the print ticket file when the CPU 21 generates the print ticket file. FIG. 3 shows a part of the data, content of the print ticket file generated by the CPU 21. According to FIG. 3, the data size of the XPS file is 640,000 bytes.

[Functional Configuration of Image Forming Apparatus]

Figure 4:
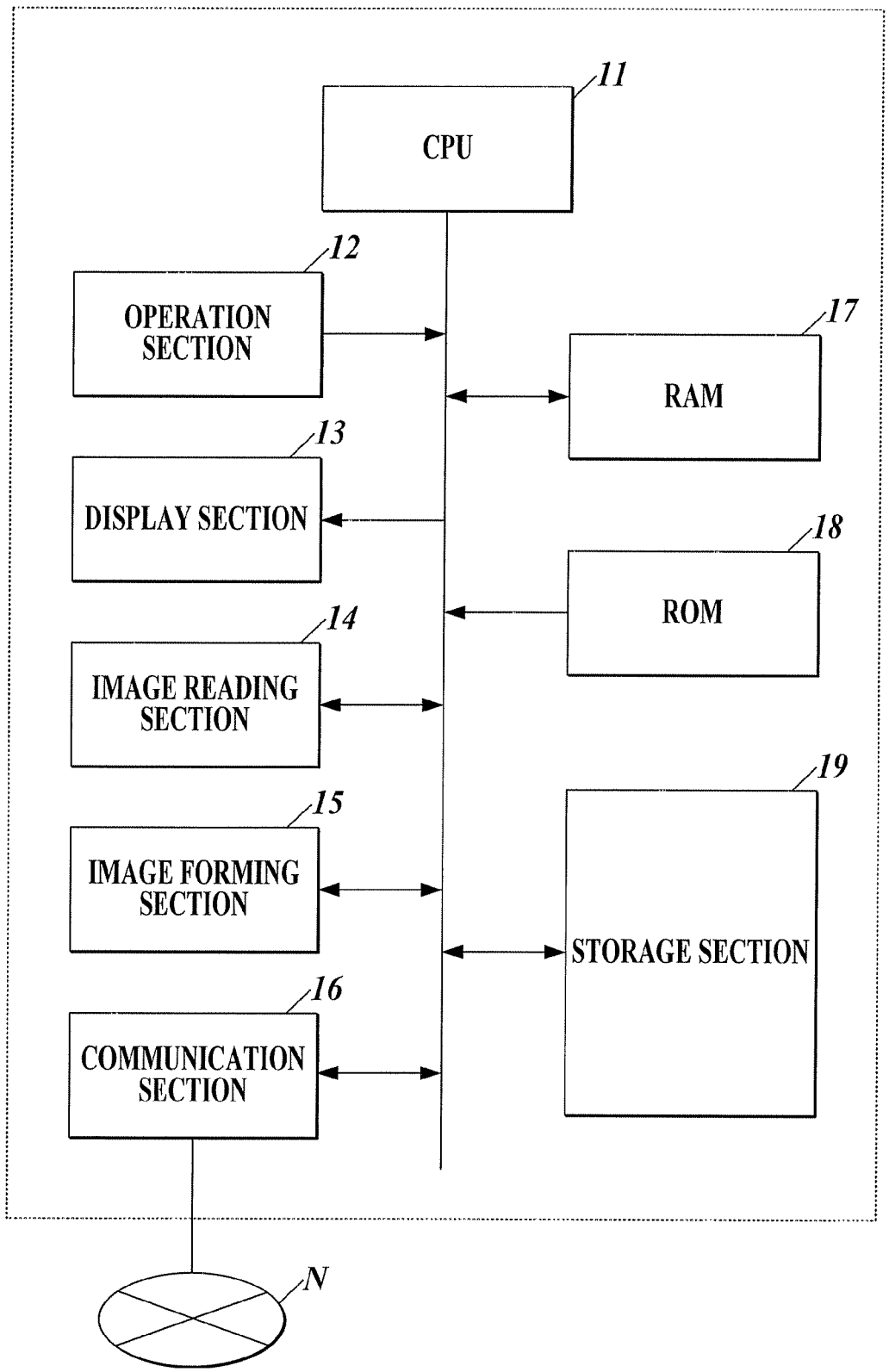
FIG. 4 is a block diagram of an image forming apparatus.

FIG. 4 shows the configuration of the image forming apparatus 10. As shown in FIG. 4, the image forming apparatus 10 is composed of a CPU 11, an operation section 12, a display section 13, an image reading section 14, an image forming section 15, a communication section 16, a RAM 17, a read only memory (ROM) 18, and a storage section 19.

The CPU 11 reads the various processing programs stored in the ROM 18 and expands the read processing programs into a work area formed in the RAM 17 to perform various kinds of processing in cooperation with the expanded programs according to operation signals input from the operation section 12 or instruction signals received by the communication section 16.

The operation section 12 includes various keys, such as numeral keys, a start key, and a reset key, and outputs the depression signal of a depressed key to the CPU 11. Moreover, the operation section 12 is equipped with a touch panel integrally formed with the display section 13, and detects the position on the touch panel against which a fingertip of a user, a touch pen, or the like, abuts to output a position signal to the CPU 11.

The image reading section 14 is the so-called scanner, which reads an original image to generate image data, and is equipped with a platen glass, on which an original is placed, and a scanning optical system, which scans the original image on the platen glass to form the image thereof on a CCD image sensor. The image reading section 14 performs the analog to digital (A/D) conversion of an image signal generated on the basis of the original image read by the CCD image sensor to generate a digital image signal.

The image forming section 15 is a function section including constituent elements necessary for forming an image by using an image forming process, such as an electrophotographic printing process, an electrostatic recording process, and a thermal transfer process. For example, the image forming section 15 is composed of a photosensitive body, a transfer belt, a fixing device, various conveying belts, an electronic circuit, a paper feeding section, a paper ejection section and the like. The image forming section 15 forms an image on a sheet of paper supplied from the paper feeding section on the basis of the image data generated by the image reading section 14, the image data included in an XPS file received by the communication section 16, or the like, to convey the sheet of paper to the paper ejection section in accordance with an instruction of the CPU 11. Moreover, the paper feeding section is equipped with a paper feeding tray, and the paper ejection section is equipped with a paper ejection tray.

The communication section 16 is equipped with a local area network (LAN) adapter, a router, a terminal adapter (TA), and the like, and performs the transmission and the reception of data with external equipment, such as the client terminal 20, connected to the communication section 16 through the communication network N. For example, the communication section 16 receives print job data from the client terminal 20.

The RAM 17 forms a work area to temporarily store the various processing programs to be executed by the CPU 11 and the data pertaining to these programs. Moreover, the RAM 17 stores the XPS file included in the print job data received from the client terminal 20 through the communication section 16.

The ROM 18 stores various processing programs to be executed by the CPU 11, various data, and the like. These various programs are stored in the forms of readable program codes, and the CPU 11 sequentially executes the operations in accordance with the program codes.

The storage section 19 is a storage apparatus, such as a hard disk, and stores the image data read by the image reading section 14 and the XPS file included in the print job data received from the client terminal 20 through the communication section 16. Moreover, the storage capacity of the storage section 19 is larger than that of the RAM 17. Moreover the access speed of the storage section 19 from the CPU 11 is slower than that of the RAM 17.

When the communication section 16 starts to receive the XPS file included in print job data from the client terminal 20, the CPU 11 executes the ZIP decompression of the print ticket file stored in the XPS file and obtains the data size information of the XPS file.

Because the print ticket file is stored at the head of the file data frame of the XPS file here, the communication section 16 first receives the print ticket file included in the XPS file.

The CPU 11 then selects the storage medium to store the XPS file between the RAM 17 and the storage section 19 on the basis of the data size information of the obtained XPS file, and allows the selected storage medium to store the XPS file.

If there is a free memory capacity to store the XPS file in the RAM 17 here, then the CPU 11 allows the RAM 17 to store the XPS file. Moreover, if there are no free memory capacities to store the XPS file in the RAM 17, then the CPU 11 allows the storage section 19 to store the XPS file. Furthermore, if there are no free hard disk capacities to store the XPS file also in the storage section 19, then there are no storage media to store the XPS file. The CPU 11 accordingly allows the display section 13 to perform the error display to the effect.

By such control, the XPS file can be stored in a storage medium having the fastest access speed and a sufficient storage capacity. Moreover, if there are no storage media having a sufficient storage capacity, then the error can be detected before the XPS file is spooled.

The CPU 11 reads the XPS file stored in the RAM 17 or the storage section 19 and performs the ZIP decompression of the XPS file. The CPU 11 then allows the storage medium (RAM 17 or storage section 19) to store the file data of the decompressed XPS file.

The CPU 11 generates an image formation instruction on the basis of the file data of the decompressed XPS file stored in the RAM 17 or the storage section 19 and the print condition data included in the print job data received from the client terminal 20 through the communication section 16, and outputs the generated image formation instruction to the image forming section 15.

[Concrete Operation of Each Apparatus]
[Concrete Operation of Client Terminal]

Figure 5:
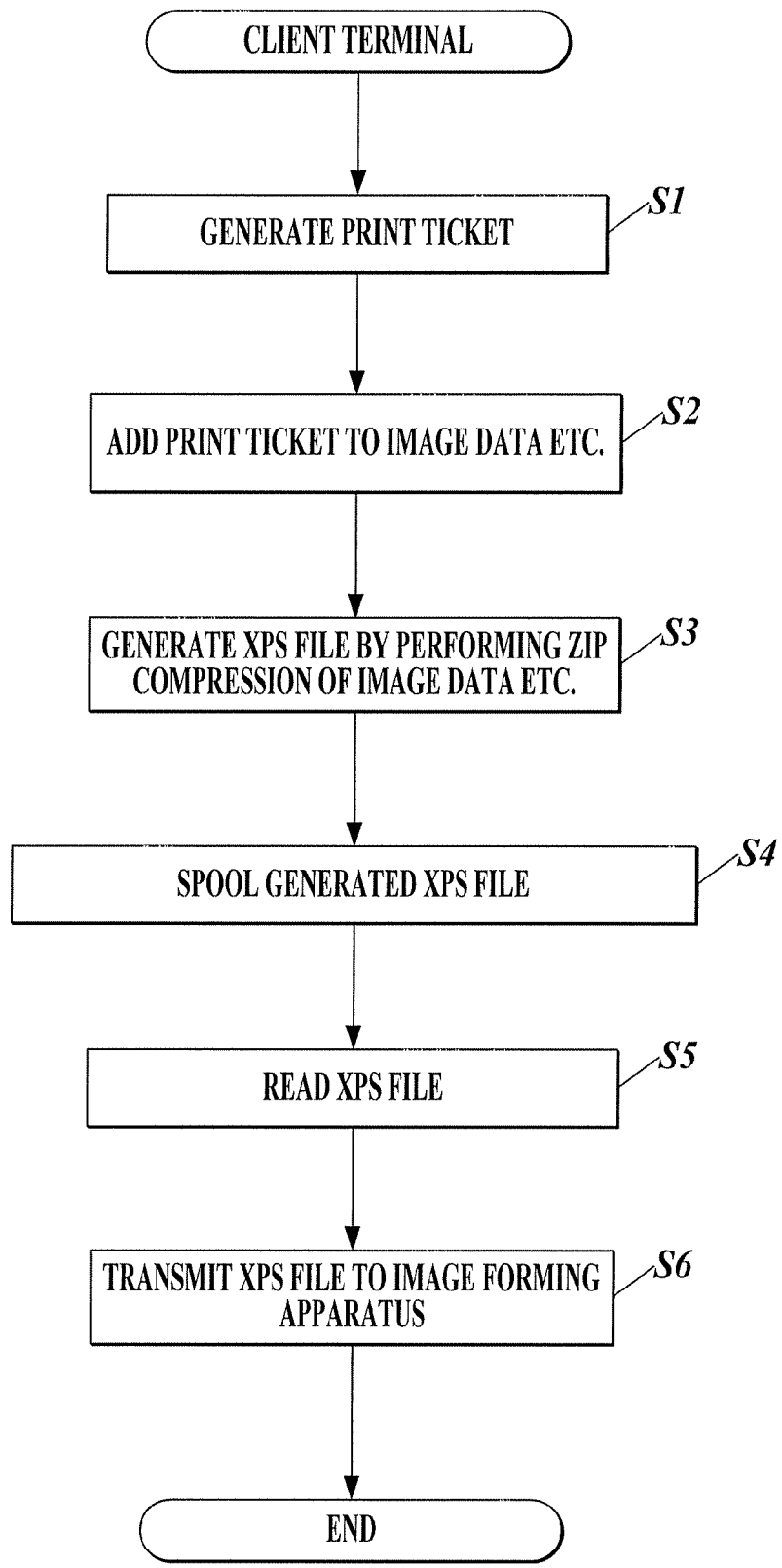
FIG. 5 is a flowchart showing the processing executed in the client terminal.

Next, the concrete operation of the client terminal 20 will be described. FIG. 5 is a flowchart showing the processing to be executed in the client terminal 20. The present flowchart aims at only the XPS file as the data to be generated by the client terminal 20.

A user first specifies image data (image file) or the like to be a print object, and sets the information such as the number of sets and a print range.

As shown in FIG. 5, the client terminal 20 then generates a print ticket (print ticket file) including the data size information of the XPS file to be generated (Step S1). The client terminal 20 then adds the generated print ticket file to the image file or the like (Step S2), and performs ZIP compression to generate an XPS file (Step S3).

The client terminal 20 next allows the storage section 26 to store the generated XPS file to spool the XPS file (Step S4). The client terminal 20 then reads the XPS file from the storage section 26 (Step S5) to transmit the read XPS file to the image forming apparatus 10 according to the processing situation of the image forming apparatus 10 (Step S6).

[Concrete Operation of Image Forming Apparatus]

Figure 6:
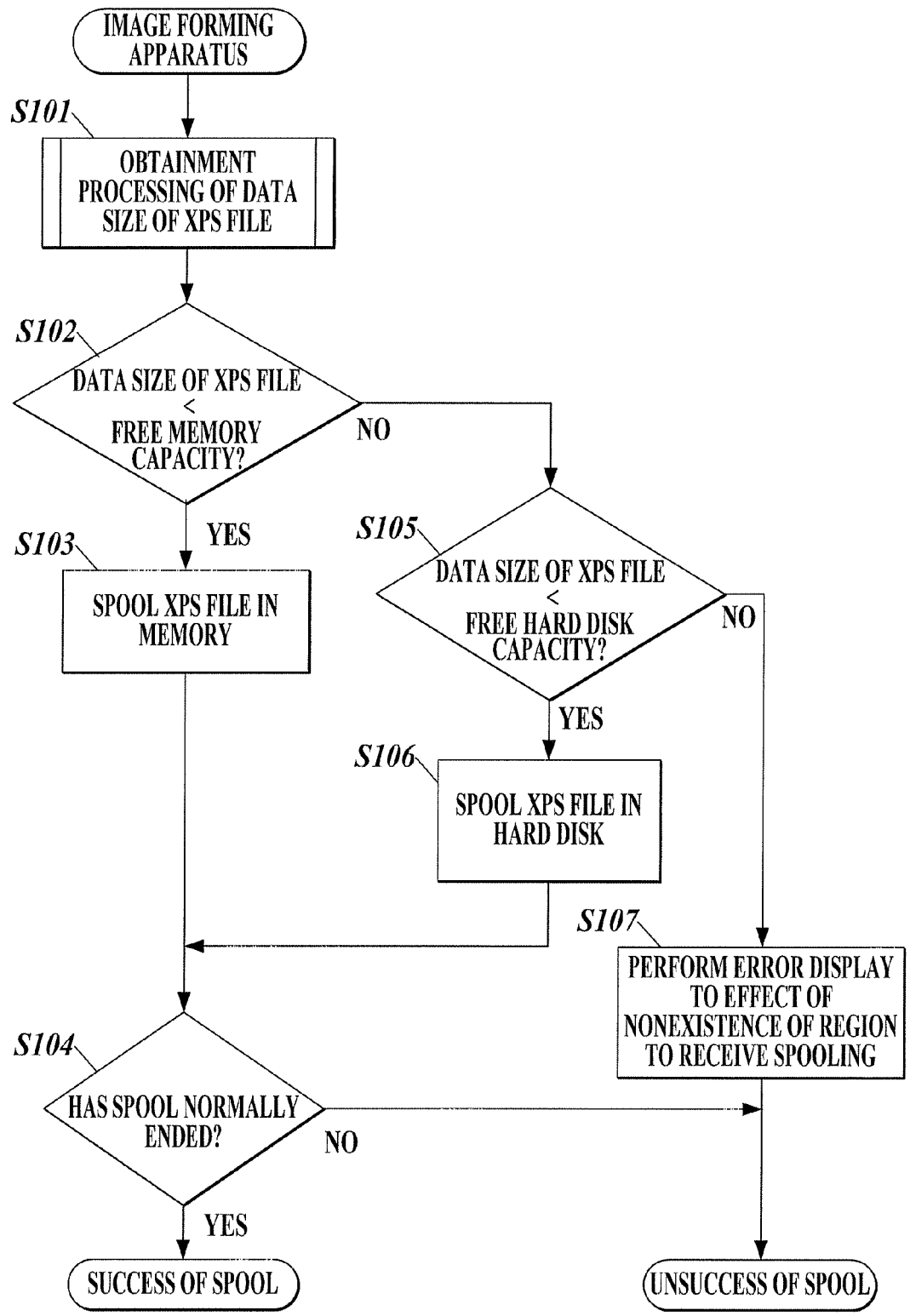
FIG. 6 is a flowchart showing the processing executed in an image forming apparatus of a first embodiment.

The concrete operation of the image forming apparatus 10 is next described. FIG. 6 is a flowchart showing the processing executed in the image forming apparatus 10. As shown in FIG. 6, when the image forming apparatus 10 starts to receive an XPS file from the client terminal 20, the image forming apparatus 10 obtains the data size information of the XPS file (Step S101).

Figure 7:
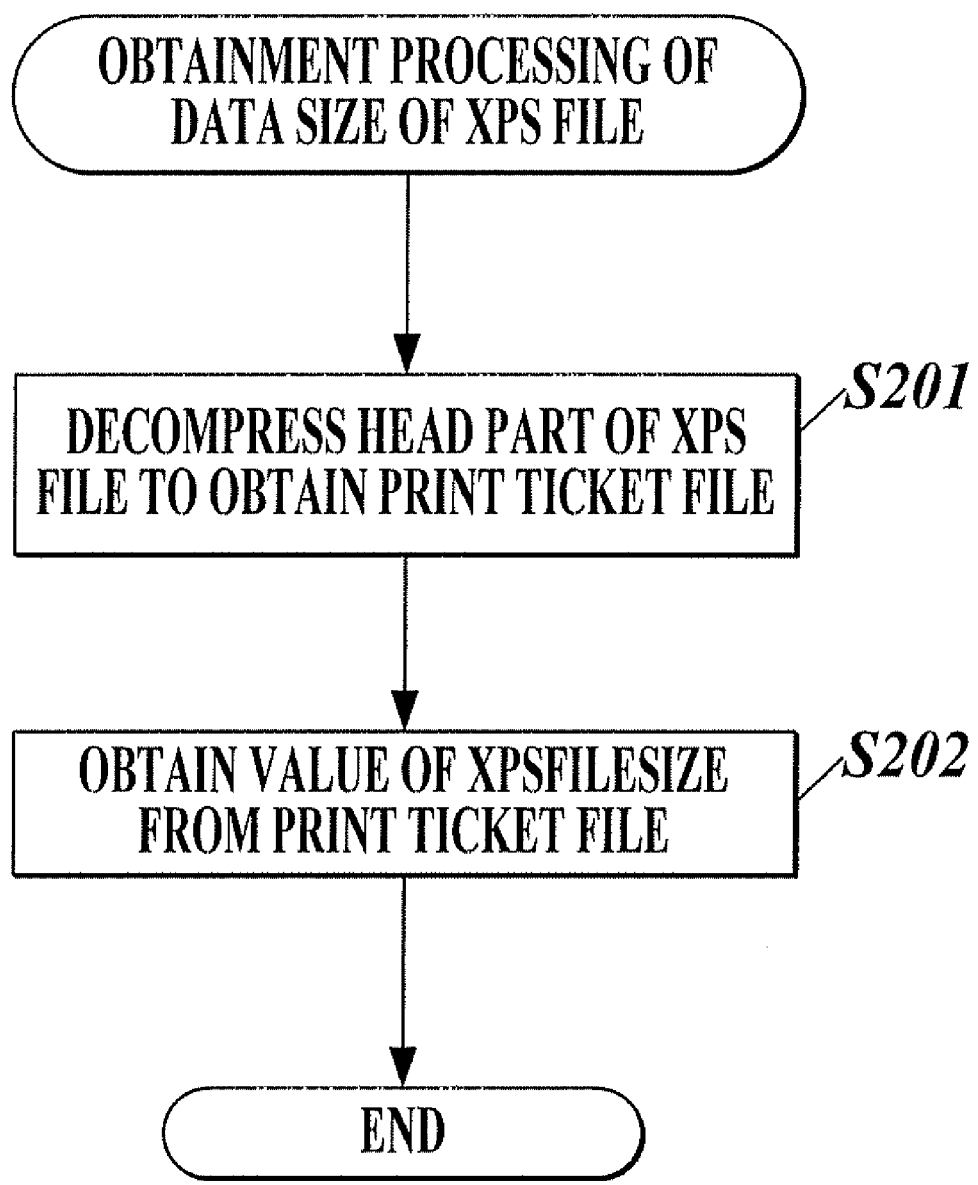
FIG. 7 is a flowchart showing the obtainment processing of the data size of an XPS file.

The concrete contents of the obtainment processing of data size information of the XPS file (Step S101 in FIG. 6) in the image forming apparatus 10 are described here with reference to FIG. 7.

As shown in FIG. 7, when the image forming apparatus 10 starts to receive the XPS file from the client terminal 20, the image forming apparatus 10 decompresses the head of the file data frame of the XPS file, and reads (obtains) the print ticket file from the head (Step S201). The image forming apparatus 10 then obtains the value of "XPSFileSize" (see FIG. 3), that is, the data size information of the XPS file, from the print ticket file (Step S202).

Returning to FIG. 6, the image forming apparatus 10 next compares the free memory capacity of the RAM 17 with the data size of the XPS file (Step S102). If the free memory capacity of the RAM 17 is larger than the data size as the result of the comparison (Step S102; Yes), the image forming apparatus 10 allows the RAM 17 to store (spool) the XPS file (Step S103).

The image forming apparatus 10 then judges whether the spool has normally ended or not (Step S104). If the spool has normally ended (Step S104; Yes), the image forming apparatus 10 reads the spooled XPS file, performs ZIP decompression of the read XPS file, spools the file data on which the ZIP decompression was performed, generates an image formation instruction on the basis of the spooled file data and the like and performs an image forming processing on the basis of the image formation instruction. On the other hand, if the spool has not normally ended (Step S104; No), the image forming apparatus 10 does not perform the above processing and ends the processing.

Moreover, if the data size of the XPS file is equal to or larger than the free memory capacity of the RAM 17 as the result of the comparison at Step S102 (Step S102; No), the image forming apparatus 10 compares the free hard disk capacity of the storage section 19 with the data size of the XPS file (Step S105). If the free hard disk capacity of the storage section 19 is larger than the data size as the result of the comparison (Step S105; Yes), then the image forming apparatus 10 allows the storage section 19 to store (spool) the XPS file (Step S106).

The image forming apparatus 10 then judges whether the spool has normally ended or not (Step S104) and the processing ends.

Moreover, if the data size of the XPS file is equal to or larger than the free hard disk capacity of the storage section 19 as the result of the comparison at Step S105 (Step S105; No), then the image forming apparatus 10 displays an error display to the effect of the nonexistence of the region capable of receiving the spool in the display section 13 (Step S107), and ends the processing without performing the image forming processing.

As described above, according to the first embodiment, the client terminal 20 generates the XPS file storing the print ticket including the data size information of the XPS file in the head of the file data frame thereof to transmit the generated XPS file to the image forming apparatus 10. When the image forming apparatus 10 starts to receive the XPS file, the image forming apparatus 10 selects the storage medium to store the XPS file between the RAM 17 and the storage section 19 on the basis of the data size information of the XPS file, which data size information is included in the print ticket. The image forming apparatus 10 then allows the selected storage medium to store the XPS file therein.

The image forming apparatus 10 can consequently allow the optimum storage medium, that is, the storage medium having the fastest access speed and a sufficient storage capacity, between the RAM 17 and the storage section 19 to store the XPS file therein, and can realize efficient and high-speed image forming processing.

Furthermore, if the storage capacities of the RAM 17 and the storage section 19 are not sufficient for storing the XPS file, then the image forming apparatus 10 allows the display section 13 to display the error display to the effect. Consequently, it becomes unnecessary to continue receiving the XPS file until the storage capacities overflow.

Incidentally, in the present embodiment, the image forming apparatus 10 allows either of the RAM 17 or the storage section 19 to store the XPS file, but the present invention is not limited to this embodiment. For example, the image forming apparatus 10 may be equipped with another storage medium (for example, a flash memory) besides the RAM 17 and the storage section 19 to allow any one of the three or more storage media to store the XPS file.

Second Embodiment

In the following, a second embodiment of an image forming system according to the present invention will be described. Incidentally, different points from those of the first embodiment will be chiefly described in the present description.

[Data Configuration of ZIP File]

Figure 8:
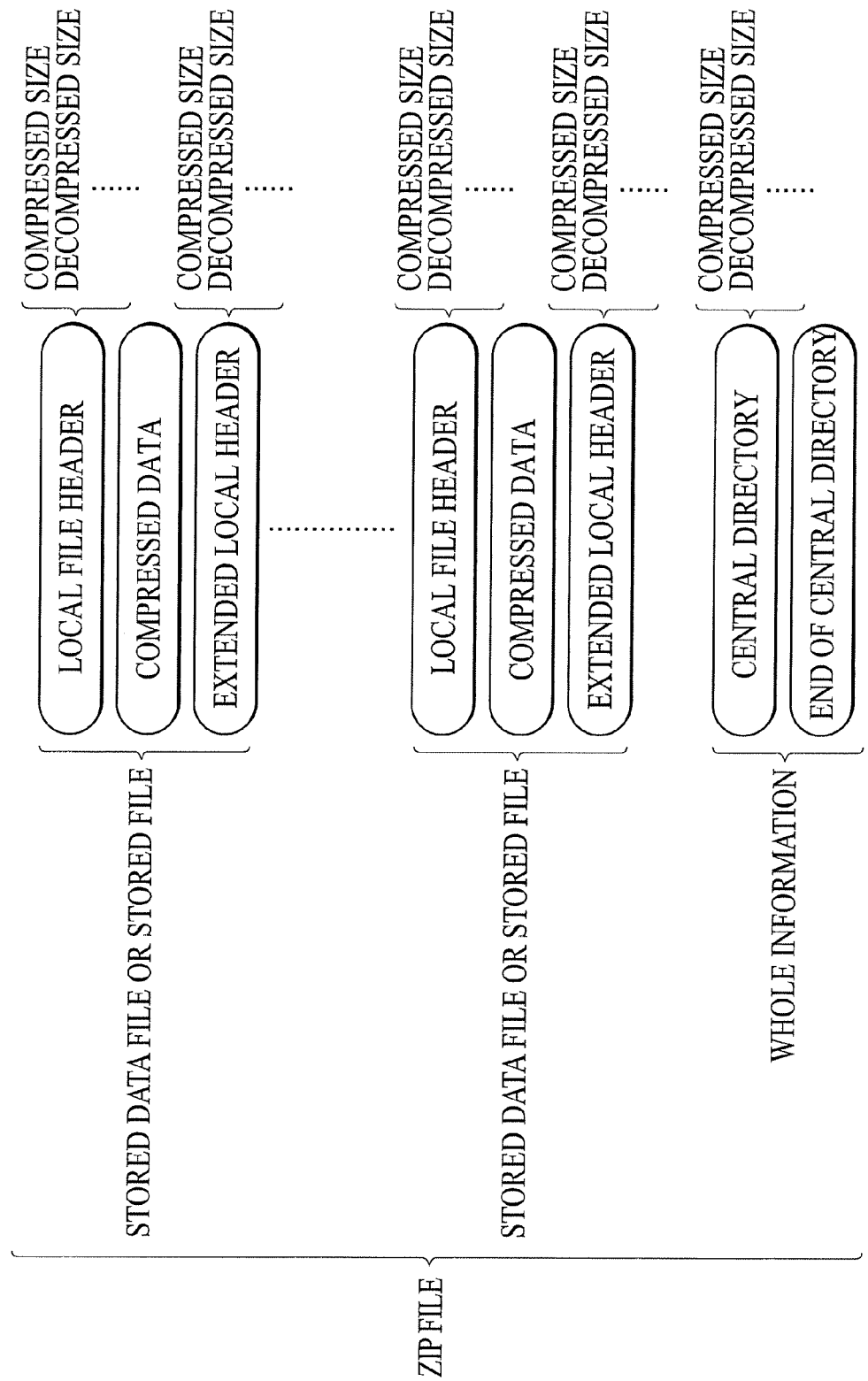
FIG. 8 is a data configuration diagram of a ZIP file.

FIG. 8 is the data configuration diagram of a ZIP file. As shown in FIG. 8, the ZIP file is composed of one or a plurality of data files (hereinafter referred to as stored files) and the whole information.

Each of the stored files is composed of a "Compressed data" frame, which is compressed data, and a "Local file header" frame and an "Extended local header" frame, both of which are the pieces of header information of the stored file situated at the front and the back of the "Compressed data" frame, respectively. The whole information is then composed of a "Central directory" frame and an "End of central directory" frame.

The "Local file header" frame and the "Extended local header" frame, which are the pieces of header information of the stored file, stores a "compressed size," which indicates the data size of the "Compressed data" frame, and a "decompressed size," which indicates the ZIP-decompressed data size of the "Compressed data" frame.

Moreover, the "Central directory" frame, which is the whole information, stores a "compressed size," which indicates the data size of the whole ZIP file, and a "decompressed size," which indicates the data size of the whole ZIP-decompressed ZIP file.

[Functional Configuration of Client Terminal]

When the CPU 21 of the client terminal 20 performs ZIP compression to generate an XPS file, the CPU 21 of the client terminal 20 writes the data size of the "Compressed data" frame into the "compressed size" of each of the "Local file header" frame, which is the header information of one or a plurality of stored files included in an XPS file, and writes the ZIP-decompressed data size of the "Compressed data" frame into the "decompressed size" of the "Local file header" frame.

[Functional Configuration of Image Forming Apparatus]

When the communication section 16 starts to receive the XPS file included in print job data from the client terminal 20, the CPU 11 first analyzes the header information ("Local file header" frame) of the stored file stored in the head of the file data frame of the XPS file to obtain the data size information ("compressed size") of the stored file. The CPU 11 then selects the storage medium to store the stored file stored in the head between the RAM 17 and the storage section 19 on the basis of the data size information of the stored file, and allows the selected storage medium to store the stored file data.

If there is a free memory capacity to store the stored file in the RAM 17 here, then the CPU 11 allows the RAM 17 to store the stored file. Moreover, if there are no free memory capacities to store the stored file in the RAM 17, then the CPU 11 allows the storage section 19 to store the stored file. Furthermore, if there are no free hard disk capacities to store the stored file also in the storage section 19, then there are no storage media to store the stored file. The CPU 11 accordingly allow the display section 13 to perform the error display to the effect.

After the CPU 11 has made the selected storage medium store the stored file, the CPU 11 analyzes the header information ("Local file header" frame) of the stored file stored at the second file data frame of the XPS file to obtain the data size information ("compressed size") of the stored file. The CPU 11 then selects the storage medium to store the stored file stored in the second file data frame between the RAM 17 and the storage section 19 on the basis of the data size information of the stored file to allow the selected storage medium to store the stored file.

The CPU 11 then performs the similar processing also to the stored files stored in the third, fourth, fifth . . . file data frames of the XPS file. The CPU 11 repeatedly performs the processing up to the stored file stored at the last file data frame of the XPS file.

[Concrete Operation of Image Forming Apparatus]

Figure 9:
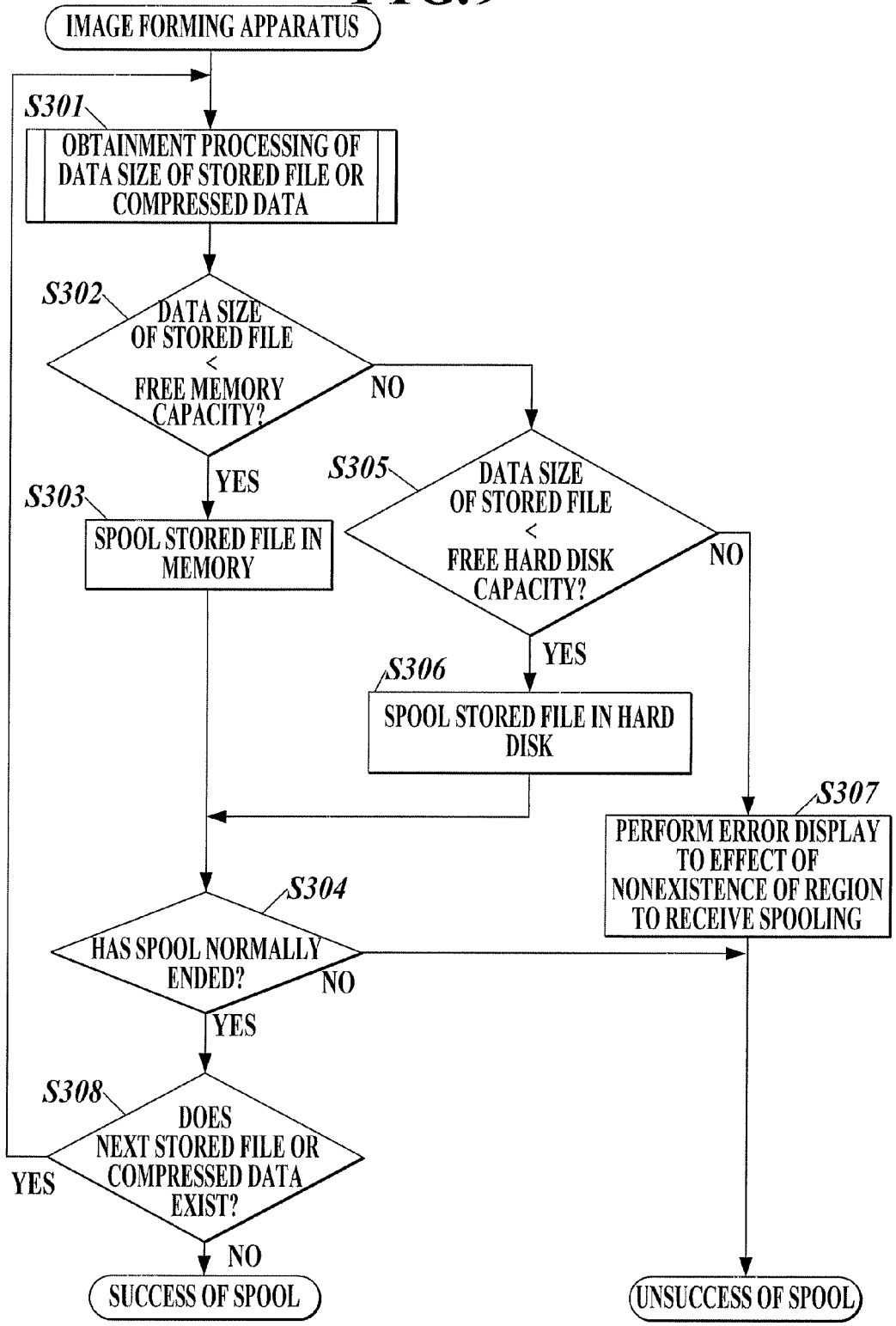
FIG. 9 is a flowchart showing the processing executed by an image forming apparatus of a second embodiment.

The concrete operation of the image forming apparatus 10 is next described. FIG. 9 is a flowchart showing the processing executed in the image forming apparatus 10. As shown in FIG. 9, when the image forming apparatus 10 starts to receive an XPS file from the client terminal 20, the image forming apparatus 10 obtains the data size information of the stored file ("Compressed data" frame) stored in the head of the XPS file (Step S301).

Figure 10:
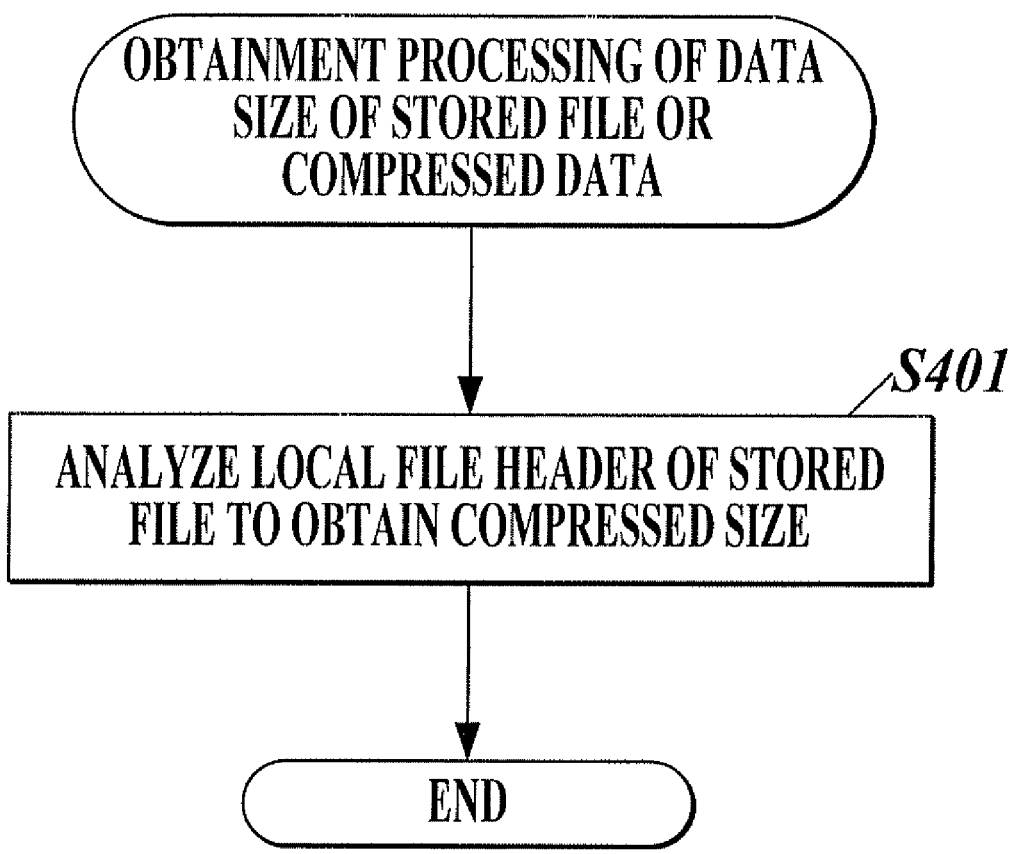
FIG. 10 is a flowchart showing the obtainment processing of the data size of a stored file.

The concrete contents of the obtainment processing of the data size information of the stored file included in the XPS file in the image forming apparatus 10 (Step S301 in FIG. 9) are described here with reference to FIG. 10.

As shown in FIG. 10, the image forming apparatus 10 analyzes the header information ("Local file header" frame) of the stored file included in the XPS file transmitted from the client terminal 20 to obtain the data size information ("compressed size") (Step S401).

Returning to FIG. 9, the image forming apparatus 10 next compares the free memory capacity of the RAM 17 with the data size of the stored file (Step S302). If the free memory capacity of the RAM 17 is larger than the data size as the result of the comparison (Step S302; Yes), the image forming apparatus 10 allows the RAM 17 to store (spool) the stored file (Step S303).

The image forming apparatus 10 then judges whether the spool has normally ended or not (Step S304).

Moreover, if the data size of the stored file is equal to or larger than the free memory capacity of the RAM 17 as the result of the comparison at Step S302 (Step S302; No), the image forming apparatus 10 compares the free hard disk capacity of the storage section 19 with the data size of the stored file (Step S305). If the free hard disk capacity of the storage section 19 is larger than the data size as the result of the comparison (Step S305; Yes), then the image forming apparatus 10 allows the storage section 19 to store (spool) the stored file (Step S306).

The image forming apparatus 10 then judges whether the spool has normally ended or not (Step S304).

Moreover, if the data size of the stored file is equal to or larger than the free hard disk capacity of the storage section 19 as the result of the comparison at Step S305 (Step S305; No), then the image forming apparatus 10 displays an error display to the effect of the nonexistence of the region capable of receiving the spool in the display section 13 (Step S307), and ends the processing without performing the image forming processing.

Moreover, if the spool has normally ended (Step S304; Yes) as the result of the judgment at Step S304, then the image forming apparatus 10 judges whether the next stored file ("Compressed data") stored in the XPS file exists or not (Step S308). If the next stored file exists (Step S308; Yes) as the result of the judgment at Step S308, then the image forming apparatus 10 obtains the data size information of the next stored file (Step S301). The image forming apparatus 10 then repeats the processing.

Moreover, if the next stored file does not exist as the result of the judgment at Step S308 (Step S308; No), then the image forming apparatus 10 reads the spooled stored files, performs ZIP decompression of the read stored files, spools the file data on which the ZIP decompression was performed, and generates an image formation instruction on the basis of the spooled file data and the like to perform image forming processing on the basis of the image formation instruction.

Moreover, if the spool has not normally ended (Step S304; No) as the result of the judgment at Step S304, the image forming apparatus 10 does not perform the image forming processing and ends the processing.

As described above, according to the second embodiment, the client terminal 20 writes the data size information of a stored file into the header information of each stored file included in an XPS file at the time of performing the ZIP compression of the XPS file to generate the XPS file. The client terminal 20 then transmits the generated XPS file to the image forming apparatus 10.

When the image forming apparatus 10 starts to receive the XPS file, the image forming apparatus 10 selects the storage medium to store the stored file in the head between the RAM 17 and the storage section 19 on the basis of the data size information of the stored file in the head.

The image forming apparatus 10 then allows the selected storage medium to store the stored file therein. The image forming apparatus 10 then repeats the similar processing also to the stored files stored in the second, third, fourth, fifth . . . file data frames.

The image forming apparatus 10 can consequently allow the optimum storage medium, that is, the storage medium having the fastest access speed and a sufficient storage capacity, between the RAM 17 and the storage section 19 to store each stored file stored in the XPS file therein, and can realize efficient and high-speed image forming processing.

Third Embodiment

In the following, a third embodiment of an image forming system according to the present invention will be described. Incidentally, different points from those of the first and second embodiment will be chiefly described in the present description.

[Functional Configuration of Image Forming Apparatus]

The CPU 11 of the image forming apparatus 10 selects the storage medium (RAM 17 or storage section 19) to store the XPS file included in the print job data received from the client terminal 20 through the communication section 16 and allows the selected storage medium to store the XPS file therein.

The CPU 11 analyzes the whole information ("Central directory" frame) of the XPS file (ZIP file) from the XPS file stored in the storage medium (RAM 17 or storage section 19) and obtains the data size information "decompressed size" of the whole ZIP-decompressed XPS file (ZIP file). The CPU 11 then selects the storage medium to store the file data of the ZIP-decompressed XPS file between the RAM 17 and the storage section 19 on the basis of the data size information of the whole ZIP-decompressed XPS file.

The CPU 11 then reads the XPS file stored in the storage medium (RAM 17 or storage section 19) and performs the ZIP decompression of the XPS file. The CPU 11 then allows the selected storage medium (RAM 17 or storage section 19) to store the file data of the ZIP-decompressed XPS file.

The CPU 11 generates an image formation instruction on the basis of the file data of the ZIP-decompressed XPS file stored in the RAM 17 or the storage section 19 and the print condition data included in the print job data received from the client terminal 20 through the communication section 16, and outputs the generated image formation instruction to the image forming section 15.

[Concrete Operation of Image Forming Apparatus]

Figure 11:
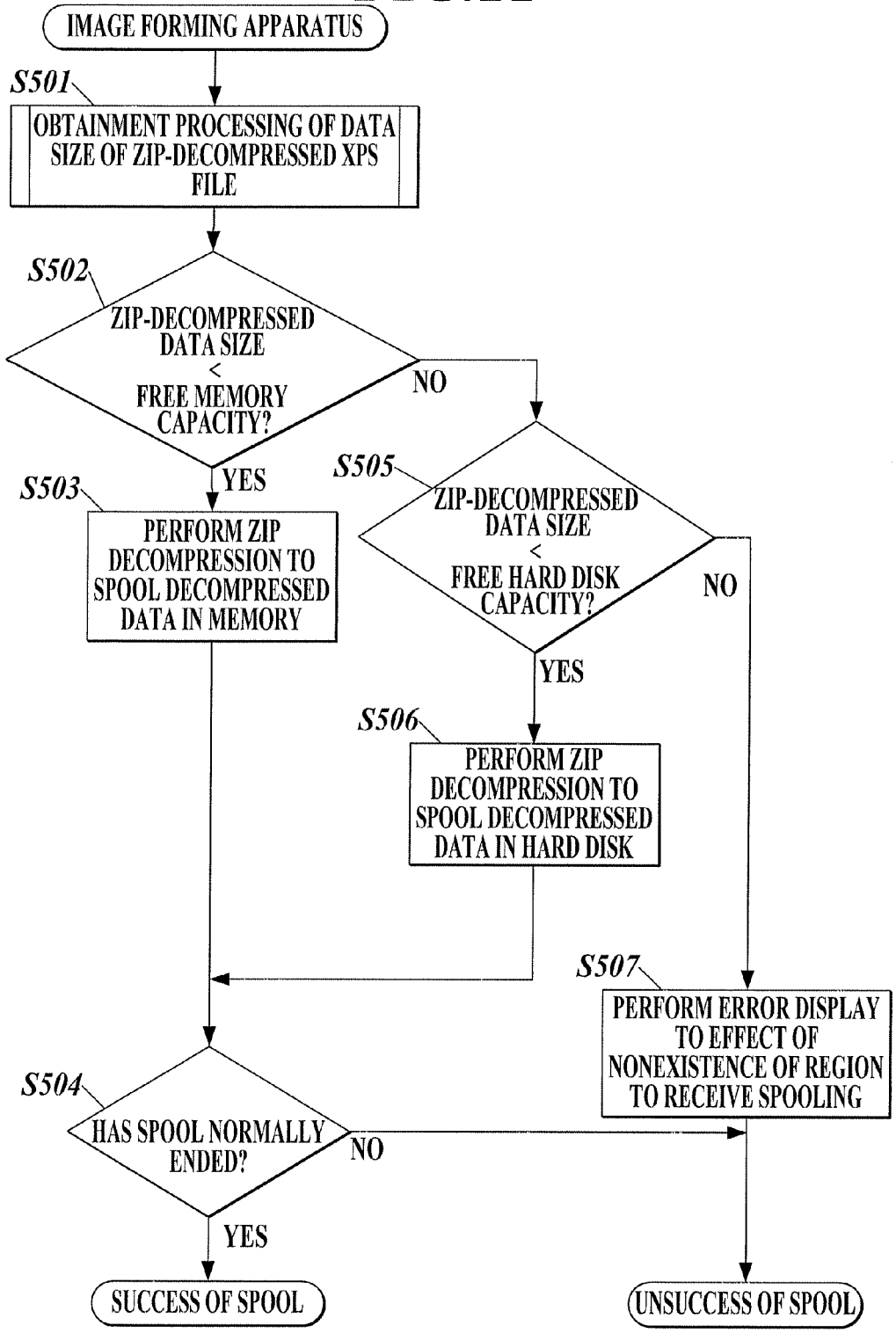
FIG. 11 is a flowchart showing the processing executed by an image forming apparatus of a third embodiment.

The concrete operation of the image forming apparatus 10 is next described. FIG. 11 is a flowchart showing the processing executed in the image forming apparatus 10. As shown in FIG. 11, the image forming apparatus 10 obtains the data size information of the ZIP-decompressed XPS file stored in the storage medium (RAM 17 or storage section 19) transmitted from the client terminal 20 (Step S501).

Figure 12:
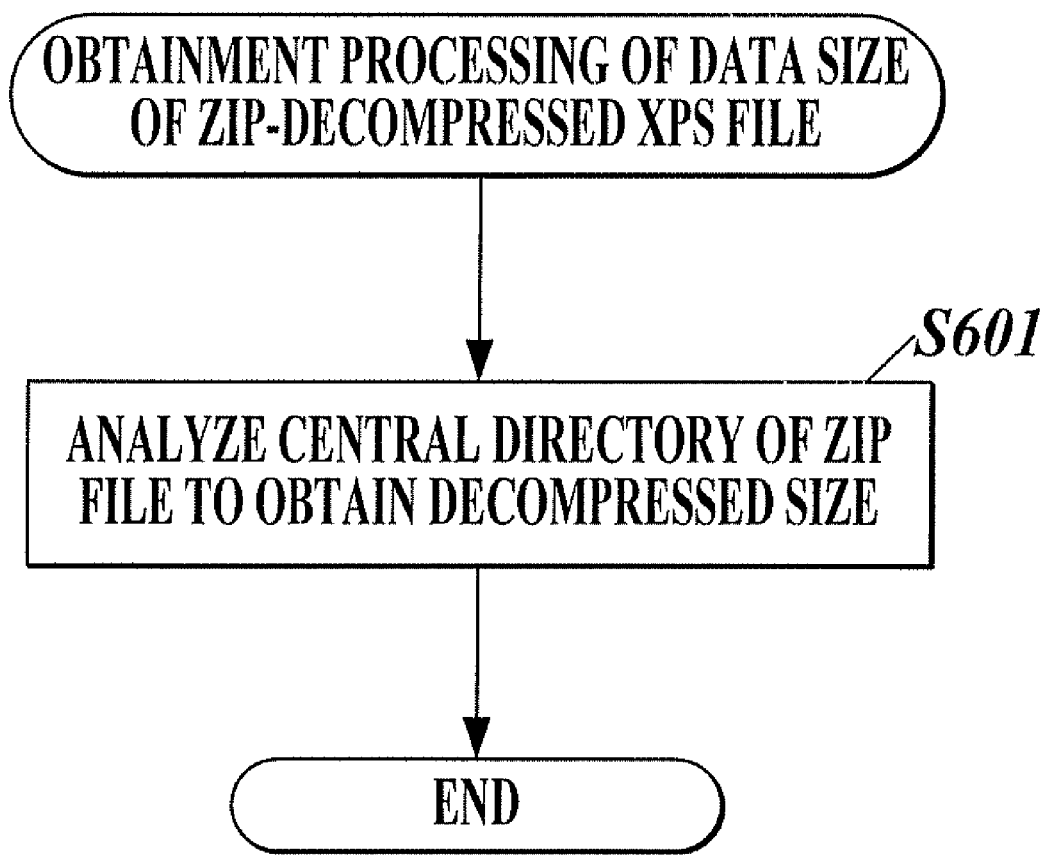
FIG. 12 is a flowchart showing the obtainment processing of the data size of a decompressed XPS file.

The concrete contents of the obtainment processing of the data size information of the ZIP-decompressed XPS file (Step S501 in FIG. 11) in the image forming apparatus 10 are described here with reference to FIG. 12.

As shown in FIG. 12, the image forming apparatus 10 analyzes the whole information ("Central directory" frame) of the XPS file (ZIP file) stored in the storage medium (RAM 17 or storage section 19) to obtain the data size information "decompressed size" (see FIG. 8) of the whole ZIP-decompressed XPS file (ZIP file) (Step S601).

Returning to FIG. 11, the image forming apparatus 10 next compares the free memory capacity of the RAM 17 with the data size of the ZIP-decompressed XPS file (Step S502). If the free memory capacity of the RAM 17 is larger than the data size as the result of the comparison (Step S502; Yes), the image forming apparatus 10 performs the ZIP decompression of the XPS file to allow the RAM 17 to store (spool) the ZIP-decompressed file data (Step S503).

The image forming apparatus 10 then judges whether the spool has normally ended or not (Step S504). If the spool has normally ended (Step S504; Yes), then the image forming apparatus 10 generates an image formation instruction to perform image forming processing on the basis of the file data of the spooled ZIP-decompressed XPS file and the like. If the spool has not normally ended (Step S504; No) the image forming apparatus 10 does not perform the image forming processing and ends the processing.

Moreover, if the data size of the ZIP-decompressed XPS file is equal to or larger than the free memory capacity of the RAM 17 as the result of the comparison at Step S502 (Step S502; No), the image forming apparatus 10 compares the free hard disk capacity of the storage section 19 with the data size of the ZIP-decompressed XPS file (Step S505). If the free hard disk capacity of the storage section 19 is larger than the data size as the result of the comparison (Step S505; Yes), then the image forming apparatus 10 performs the ZIP decompression of the XPS file to allow the storage section 19 to store (spool) the ZIP-decompressed data (Step S506).

The image forming apparatus 10 then judges whether the spool has normally ended or not (Step S504).

Moreover, if the data size of the ZIP-decompressed XPS file is equal to or larger than the free hard disk capacity of the storage section 19 as the result of the comparison at Step S505 (Step S505; No), then the image forming apparatus 10 displays an error display to the effect of the nonexistence of the region capable of receiving the spool in the display section 13 (Step S507), and ends the processing without performing the image forming processing.

As described above, according to the third embodiment, the image forming apparatus 10 spools the XPS file received from the client terminal 20 into the optimum storage medium (RAM 17 or storage section 19) and performs ZIP decompression of the spooled XPS file to spool the ZIP-decompressed file data into the optimum storage medium (RAM 17 or storage section 19). Consequently, the image forming apparatus 10 can realize efficient and high-speed image forming processing.

What is claimed is:

1. An image forming apparatus to perform image formation on the basis of data transmitted from a data processing apparatus, the image forming apparatus comprising:
    a communication section that receives, from the data processing apparatus, an XPS file including a header and file data, wherein the header includes data size information of the XPS file;
    a plurality of storage sections, each storage section having a different free storage capacity and a different access speed;
    a control section that (i) decompresses the header of the received XPS file and obtains the data size information of the XPS file prior to decompressing the remainder of the XPS file, (ii) selects a storage section to store the XPS file from the plurality of storage sections on the basis of the data size information, and (iii) allows the selected storage section to store the XPS file.

2. The image forming apparatus of claim 1, wherein the control section selects the storage section which has a faster access speed and a free storage capacity sufficient for storing the XPS file.

3. An image forming apparatus to perform image formation on the basis of data transmitted from a data processing apparatus, the image forming apparatus comprising:

a communication section that receives, from the data processing apparatus, an XPS file storing at least one file, each stored file including a header and file data, wherein the header includes data size information of its respective stored file;

a plurality of storage sections each of which has a different free storage capacity and a different access speed; and a control section that performs a processing to each stored file in the received XPS file to (i) obtain, by decompressing the header of the stored file the data size information of the stored file, prior to decompressing the remainder of the XPS file (ii) select a storage section, from the plurality of storage sections, to store the stored file on the basis of the data size information, and (iii) allow the selected storage section to store the stored file.

4. The image forming apparatus of claim 3, wherein the control section selects the storage section which has a faster access speed and a free storage capacity sufficient for storing the stored file.

5. A non-transitory computer-readable medium embodying a program to allow a computer that performs image formation on the basis of data transmitted from a data processing apparatus, to function as:

a communication section that receives, from the data processing apparatus, an XPS file including file data and a header, wherein the header includes data size information of the XPS file;

a plurality of storage sections each having a different free storage capacity and a different access speed; and a control section that (i) decompresses the header of the received XPS file and obtains the data size information of the XPS file prior to decompressing the remainder of the XPS file, (ii) selects a storage section from the plurality of storage sections to store the XPS file on the basis of the data size information, and (iii) allows the selected storage section to store the XPS file.

6. The non-transitory computer-readable medium embodying the program of claim 5, wherein the control section selects the storage section which has a faster access speed and a free storage capacity sufficient for storing the XPS file.

7. A non-transitory computer-readable medium embodying a program to allow a computer that performs image formation on the basis of data transmitted from a data processing apparatus, to function as:

a communication section that receives, from the data processing apparatus, an XPS file that stores at least one file including file data and a header, wherein the header includes data size information of its respective stored file;

a plurality of storage sections, each having a different free storage capacity and a different access speed;

and a control section to perform a processing to each stored file in the received XPS file to (i) obtain, by decompressing the header of the respective stored file, the data size information of the respective stored file prior to decompressing the remainder of the XPS file, (ii) select a storage section, from the plurality of storage sections, to store the stored file on the basis of the data size information, and (iii) allow the selected storage section to store the stored file.

8. The non-transitory computer-readable medium embodying the program of claim 7, wherein the control section selects the storage section which has a faster access speed and a free storage capacity sufficient for storing the stored file.

* * * * *